US007802220B1

(12) United States Patent
Popovich et al.

(10) Patent No.: US 7,802,220 B1
(45) Date of Patent: Sep. 21, 2010

(54) METHOD FOR EFFECTIVE PLACEMENT OF ON-CHIP DECOUPLING CAPACITORS DETERMINED BY MAXIMUM EFFECTIVE RADII

(75) Inventors: Mikhail Popovich, Rochester, NY (US); Eby G. Friedman, Rochester, NY (US)

(73) Assignee: Tasit, LLC, Rochester, NY (US)

( * ) Notice: Subject to any disclaimer, the term of this patent is extended or adjusted under 35 U.S.C. 154(b) by 187 days.

(21) Appl. No.: 11/790,678

(22) Filed: Apr. 26, 2007

(51) Int. Cl.
*G06F 17/50* (2006.01)
*G06F 9/45* (2006.01)

(52) U.S. Cl. ............................................. 716/10; 716/2
(58) Field of Classification Search .................... 716/2, 716/10
See application file for complete search history.

(56) References Cited

U.S. PATENT DOCUMENTS

| 2005/0029632 | A1* | 2/2005 | McKinzie et al. ........... 257/665 |
| 2006/0161874 | A1* | 7/2006 | Harada et al. .................. 716/8 |
| 2007/0090398 | A1* | 4/2007 | McKinzie, III .............. 257/192 |
| 2007/0120223 | A1* | 5/2007 | McKinzie et al. ........... 257/533 |
| 2007/0234245 | A1* | 10/2007 | Nguyen et al. ................ 716/4 |
| 2008/0250373 | A1* | 10/2008 | Bird et al. ...................... 716/7 |

OTHER PUBLICATIONS

Popovich et al.; "Maximum Effective Distance of On-Chip Decoupling Capacitors in Power Distribution Grids"; May 2, 2006; ACM; Philadelphia, PA, USA; All pages.*
Chen et al.; "Effective Decoupling Radius of Decoupling Capacitor"; 2001; IEEE; All pages.*
Popovich et al.; "Decoupling Capacitors for Multi-Voltage Power Distribution Systems"; Mar. 2006; IEEE; All pages.*
Popovich et al.; "On-Chip Power Distribution Grids with Multiple Supply Voltages for High Performance Integrated Circuits"; 2005; ACM; All pages.*
Popovich et al.; "Effective Radii of On-Chip Decoupling Capacitors"; Jul. 2008; IEEE; All pages.*
Mezhiba et al.; "Impedance Characteristics of Power Distribution Grids in Nanoscale Integrated Circuits"; 2004; IEEE; All pages.*
Pant et al.; "Power Grid Physics and Implications for CAD"; Jul. 26, 2006; ACM; All pages.*
Sotman et al.; "On-die Decoupling Capacitance: Frequency Domain Analysis of Activity Radius"; Sep. 11, 2006; USA; IEEE; All pages.*
Mezhiba et al.; "Scaling Trends of On-Chip Power Distribution Noise"; 2004; IEEE; All pages.*
Popovich et al.; Powerpoint presentation:"Efficient Placement of Distributed On-Chip Decoupling Capacitors in Nanoscale ICs"; Tenatively May 2007; ICCAD'07; All pages.*

(Continued)

*Primary Examiner*—Jack Chiang
*Assistant Examiner*—Suresh Memula
(74) *Attorney, Agent, or Firm*—Blank Rome LLP

(57) ABSTRACT

The maximum effective radii of an on-chip decoupling capacitor based on a target impedance (discharge) and charge time are determined. To be effective, an on-chip decoupling capacitor should be placed such that both the power supply and the current load are located inside the appropriate effective radius. If this allocation is not feasible, the current load is partitioned into several circuit blocks, reducing and distributing the localized current demands. The on-chip decoupling capacitors are allocated to each block while satisfying both effective radii criteria.

9 Claims, 10 Drawing Sheets

OTHER PUBLICATIONS

L. D. Smith, "Decoupling Capacitor Calculations for CMOS Circuits," Proceedings of the IEEE Conference on Electrical Performance of Electronic Packaging, pp. 101-105, Nov. 1994.

H. H. Chen and S. E. Schuster, "On-Chip Decoupling Capacitor Optimization for High-Performance VLSI Design," Proceedings of the IEEE International Symposium on VLSI Technology, Systems, and Applications, pp. 99-103, May 1995.

M. D. Pant, P. Pant, and D. S. Wills, "On Chip Decoupling Capacitor Optimization Using Architectural Level Prediction," IEEE Transactions on Very Large Scale Integration (VLSI) Systems, vol. 10, No. 3, pp. 319-326, Jun. 2002.

H. Su, S. S. Sapatnekar, and S. R. Nassif, "Optimal Decoupling Capacitor Sizing and Placement for Standard-Cell Layout Designs," IEEE Transactions on Computer Aided Design of Integrated Circuits and Systems, vol. 22, No. 4, pp. 428-436, Apr. 2003.

S. Zhao, K. Roy, and C.-K. Koh, "Decoupling Capacitance Allocation and Its Application to Power-Supply Noise-Aware Floorplanning," IEEE Transactions on Computer Aided Design of Integrated Circuits and Systems, vol. 21, No. 1, pp. 81-92, Jan. 2002.

Becker, Wiren D. et al., Modeling, Simulation, and Measurement of Mid-Frequency Simultaneous Switching Noise in Computer Systems, IEEE Transactions on Components, Packaging, and Manufacturing Technology—Part B, vol. 21, No. 2, May 1998, pp. 157-163.

Smith, Larry D. et al., Power Distribution System Design Methodology and Capacitor Selection for Modern CMOS Technology, IEEE Transactions on Advanced Packaging, vol. 22, No. 3, Aug. 1999, pp. 284-291.

Mezhiba, Andrey V. et al., Scaling Trends of On-Chip Power Distribution Noise, IEEE Transactions on Very Large Scale Integration (VLSI) Systems, vol. 12, No. 4, Apr. 2004, pp. 386-394.

Nassif, Sani R. et al., Technology Trends in Power-Grid-Induced Noise, SLIP'02, Apr. 6-7, 2002, San Diego, CA, pp. 55-59.

International Technology Roadmap for Semiconductors: 2004 Update, Overview and Summaries, pp. 1-51.

* cited by examiner

METHOD FOR EFFECTIVE PLACEMENT OF ON-CHIP DECOUPLING CAPACITORS DETERMINED BY MAXIMUM EFFECTIVE RADII

FIELD OF THE INVENTION

The present invention relates to a method for the placement of decoupling capacitors on a chip and more particularly to such a method which uses a maximum effective radii.

DESCRIPTION OF RELATED ART

The feature size of integrated circuits (IC) has been aggressively reduced in the pursuit of improved speed, power, and cost. Semiconductor technologies with a feature size of several tens of nanometers are currently in development. The scaling of CMOS is expected to continue for at least another decade. Future nanometer circuits will soon contain more than a billion transistors and operate at clock speeds well over 10 GHz. Distributing robust and reliable power and ground voltages in such a high speed, high complexity environment is, therefore, a highly challenging task.

Decoupling capacitors are widely used to manage power supply noise. A decoupling capacitor acts as a reservoir of charge, which is released when the power supply voltage at a particular current load drops below some tolerable level. Alternatively, decoupling capacitors are an effective way to reduce the impedance of power delivery systems operating at high frequencies. Since the inductance scales slowly, the location of the decoupling capacitors significantly affects the design of the power/ground (P/G) network in high performance ICs such as microprocessors. With increasing frequencies, a distributed hierarchical system of decoupling capacitors placed on-chip is needed to effectively manage the power supply noise.

The efficacy of decoupling capacitors depends upon the impedance of the conductors connecting the capacitors to the current loads and power sources. During discharge, the current flowing from the decoupling capacitor to the current load results in resistive noise (IR drops) and inductive noise $$\left(L\frac{dI}{dt}\text{ drops}\right)$$

due to the parasitic resistances and inductances of the power delivery network. The resulting voltage drop at the current load is therefore always greater than the voltage drop at the decoupling capacitor. Thus, a maximum parasitic impedance between the decoupling capacitor and the current load exists at which the decoupling capacitor is effective. Alternatively, to be effective, a decoupling capacitor should be placed close to a current load during discharge (within the maximum effective distance $d_Z^{max}$), as shown in FIG. 1.

Once the switching event is completed, a decoupling capacitor has to be fully charged before the next clock cycle begins. During the charging phase, the voltage across the decoupling capacitor rises exponentially. The charge time of a capacitor is determined by the parasitic resistance and inductance of the interconnect between the capacitor and the power supply. A design space for choosing a tolerable resistance and inductance exists, permitting the restoration of the charge at the decoupling capacitor within a target charge time. The maximum frequency at which the decoupling capacitor is effective is determined by the parasitic resistance and inductance of the metal lines and the size of the decoupling capacitor. A maximum effective distance based on the charge time, therefore, exists for each on-chip decoupling capacitor. Beyond this effective distance, the decoupling capacitor is ineffective. Alternatively, to be effective, an on-chip decoupling capacitor should be placed close to a power supply during the charging phase (within the maximum effective distance $d_{ch}^{max}$, see FIG. 1). The relative location of the on-chip decoupling capacitors is therefore of fundamental importance. A design methodology is therefore required to determine the location of an on-chip decoupling capacitor, simultaneously satisfying the maximum effective distances, $d_Z^{max}$ and $d_{ch}^{max}$.

Decoupling capacitors have traditionally been allocated on a circuit board to control the impedance of a power distribution system and suppress electro-magnetic interference (EMI). Decoupling capacitors are also employed to provide the required charge to the switching circuits, enhancing signal integrity. Since the parasitic impedance of a circuit board-based power distribution system is negligible at low frequencies, board decoupling capacitors are typically modeled as ideal capacitors without parasitic impedances. In an important early work by Smith (L. D. Smith, "Decoupling Capacitor Calculations for CMOS Circuits," *Proceedings of the IEEE Conference on Electrical Performance of Electronic Packaging*, pp. 101-105, November 1994), the effect of a decoupling capacitor on the signal integrity in circuit board-based power distribution systems is presented. The efficacy of the decoupling capacitors is analyzed in both the time and frequency domains. Simplified criteria are developed, however, which significantly overestimate the required decoupling capacitance. A hierarchical placement of decoupling capacitors has been presented by Smith et al. in L. D. Smith, R. E. Anderson, D. W. Forehand, T. J. Pelc, and T. Roy, "Power Distribution System Design Methodology and Capacitor Selection for Modern CMOS Technology," *IEEE Transactions on Advanced Packaging*, Vol. 22, No. 3, pp. 284-291, August 1999. The authors of that publication show that each decoupling capacitor is effective only within a narrow frequency range. Larger decoupling capacitors have a greater form factor (physical dimension), resulting in higher parasitic impedances. The concept of an effective series resistance (ESR) and an effective series inductance (ESL) of each decoupling capacitor is also introduced. The authors show that by hierarchically placing the decoupling capacitors from the voltage regulator module (VRM) level to the package level, the impedance of the overall power distribution system can be maintained below a target impedance.

As the signal frequency increases to several megahertz, the parasitic impedance of the circuit board decoupling capacitors becomes greater than the target impedance. The circuit board decoupling capacitors therefore become less effective at frequencies above 10 to 20 MHz. Package decoupling capacitors should therefore be utilized in the frequency range from several megahertz to several hundred megahertz. In modern high performance ICs operating at several gigahertz, only those decoupling capacitors placed on-chip are effective.

Two types of on-chip decoupling capacitances can be described. An intrinsic decoupling capacitance (or symbiotic capacitance) is comprised of transistors, interconnect, and well-to-substrate capacitances. Since the activity factor in digital circuits is typically low (10% to 30%), the intrinsic on-chip decoupling capacitance in a particular cycle is provided by the non-switching circuits. In contrast to the intrinsic capacitance, an intentional on-chip decoupling capacitance is often added. The intentional on-chip decoupling capacitance is typically an order of magnitude greater than the existing intrinsic capacitance. The intentional on-chip decoupling capacitance is therefore assumed in this disclosure to model all of the on-chip decoupling capacitance.

The optimal placement of on-chip decoupling capacitors has been discussed in H. H. Chen and S. E. Schuster, "On-Chip Decoupling Capacitor Optimization for High-Performance VLSI Design," *Proceedings of the IEEE International Symposium on VLSI Technology, Systems, and Applications*, pp. 99-103, May 1995. The power noise is analyzed assuming an RLC network model, representing a multi-layer power bus structure. The current load is modeled by time-varying resistors. The on-chip decoupling capacitors are allocated to only those areas where the power noise is greater than the maximum tolerable level. Ideal on-chip decoupling capacitors are assumed in the algorithm proposed in that publication. The resulting budget of on-chip decoupling capacitance is therefore significantly overestimated. Another technique for placing on-chip decoupling capacitors has been described in M. D. Pant, P. Pant, and D. S. Wills, "On-Chip Decoupling Capacitor Optimization Using Architectural Level Prediction," *IEEE Transactions on Very Large Scale Integration (VLSI) Systems*, Vol. 10, No. 3, pp. 319-326, June 2002. The decoupling capacitors are placed based on activity signatures determined from microarchitectural simulations. The proposed technique produces a 30% decrease in the maximum noise level as compared to uniformly placing the on-chip decoupling capacitors. This methodology results in overestimating the capacitance budget due to the use of a simplified criterion for sizing the on-chip decoupling capacitors. Also, since the package level power distribution system is modeled as a single lumped resistance and inductance, the overall power supply noise is greatly underestimated.

An algorithm for automatically placing and sizing on-chip decoupling capacitors in application-specific integrated circuits is proposed in H. Su, S. S. Sapatnekar, and S. R. Nassif, "Optimal Decoupling Capacitor Sizing and Placement for Standard-Cell Layout Designs," *IEEE Transactions on Computer-Aided Design of Integrated Circuits and Systems*, Vol. 22, No. 4, pp. 428-436, April 2003. The problem is formulated as a non-linear optimization and solved using a sensitivity-based quadratic programming solver. The proposed algorithm is limited to on-chip decoupling capacitors placed in rows of standard cells (in one dimension). The power distribution network is modeled as a resistive mesh, significantly underestimating the power distribution noise. In S. Zhao, K. Roy, and C.-K. Koh, "Decoupling Capacitance Allocation and Its Application to Power-Supply Noise-Aware Floorplanning," *IEEE Transactions on Computer-Aided Design of Integrated Circuits and Systems*, Vol. 21, No. 1, pp. 81-92, January 2002, the problem of on-chip decoupling capacitor allocation is investigated. The proposed technique is integrated into a power supply noise-aware floorplanning methodology. Only the closest power supply pins are considered to provide the switching current drawn by the load. Additionally, only the shortest and second shortest paths are considered between a decoupling capacitor and the current load. It is assumed that the current load is located at the center of a specific circuit block. The technique does not consider the degradation in effectiveness of an on-chip decoupling capacitor located at some distance from the current load. Moreover, only the discharge phase is considered. To be effective, a decoupling capacitor should be fully charged before the following switching cycle. Otherwise, the charge on the decoupling capacitor will be gradually depleted, making the capacitor ineffective. The methodology described in the above-referenced Zhao et al. publication therefore results in underestimating the power supply noise and overestimating the required on-chip decoupling capacitance.

The problem of on-chip decoupling capacitor allocation has historically been considered as two independent tasks. The location of an on-chip decoupling capacitor is initially determined. The decoupling capacitor is next appropriately sized to provide the required charge to the current load. The size of the on-chip decoupling capacitors is determined by the impedance (essentially, the physical separation) between a decoupling capacitor and the current load (or power supply).

However, separately determining the location and the size is sub-optimal.

SUMMARY OF THE INVENTION

There is thus a need in the art for a technique in which proper sizing and placement of the on-chip decoupling capacitors are determined simultaneously.

It is therefore an object of the invention to provide such a technique.

To achieve the above and other objects, the present invention is directed to the following technique. As shown in the present disclosure, on-chip decoupling capacitors are only effective in close vicinity to the switching circuit. The maximum effective distance for both the discharge and charging phases is determined. It is also shown that the on-chip decoupling capacitors should be placed both close to the current load to provide the required charge and to the power supply to be fully recharged before the next switching event.

A design methodology for placing and sizing on-chip decoupling capacitors based on the maximum effective distance as determined by the target impedance and charge time is presented.

On-chip decoupling capacitors have traditionally been allocated into the available white space on a die based on an unsystematic or ad hoc approach. On-chip decoupling capacitors, however, behave locally and should therefore be treated as a local phenomenon. The efficiency of on-chip decoupling capacitors depends upon the impedance of the P/G lines connecting the capacitors to the current loads and power supplies. A design methodology for placing on-chip decoupling capacitors is presented. A maximum effective distance between the current load or power supply and the decoupling capacitor is shown to exist. Beyond this distance, the decoupling capacitor becomes ineffective.

The maximum effective radii of an on-chip decoupling capacitor based on a target impedance (discharge) and charge time are determined. Depending upon the parasitic impedance of the P/G lines, the maximum voltage drop is caused either by the dominant inductive $$L\frac{dI}{dt}$$

noise or by the dominant resistive IR noise. Design expressions to estimate the minimum on-chip decoupling capacitance required to support expected current demands based on the dominant voltage drop are provided. The critical length of the interconnect between the decoupling capacitor and the current load is also determined.

To be effective, an on-chip decoupling capacitor should be placed such that both the power supply and the current load are located inside the appropriate effective radius. If this allocation is not feasible, the current load should be partitioned into several circuit blocks, reducing and distributing the localized current demands. The on-chip decoupling capacitors should be allocated to each block while satisfying both effective radii criteria. Summarizing, on-chip decoupling capacitors should be allocated within appropriate effective radii across an IC to satisfy local transient current demands.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
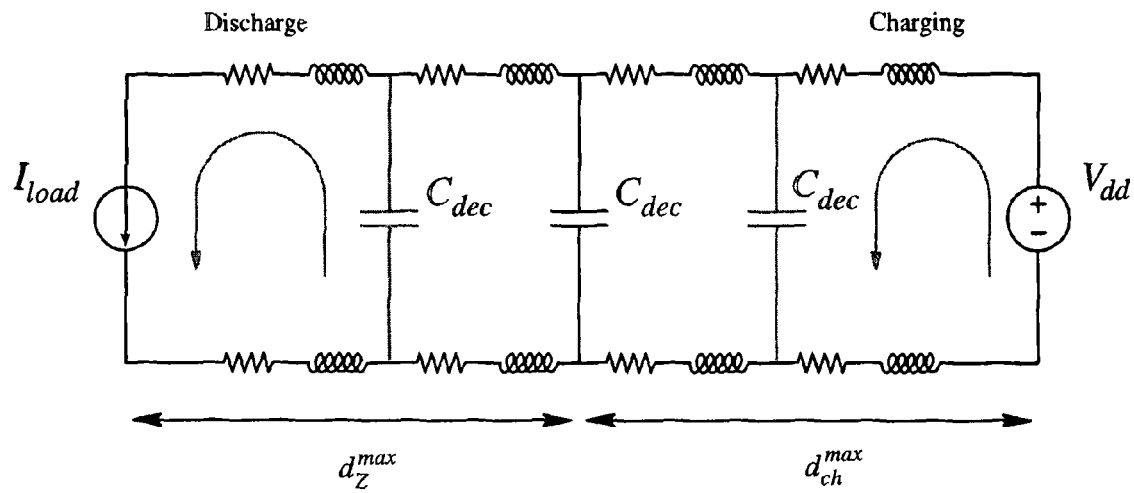
FIG. 1 shows the placement of an on-chip decoupling capacitor based on the maximum effective distance.

A preferred embodiment of the invention will be set forth in detail with reference to the drawings, in which like reference numerals refer to like elements or steps throughout.

Figure 2:
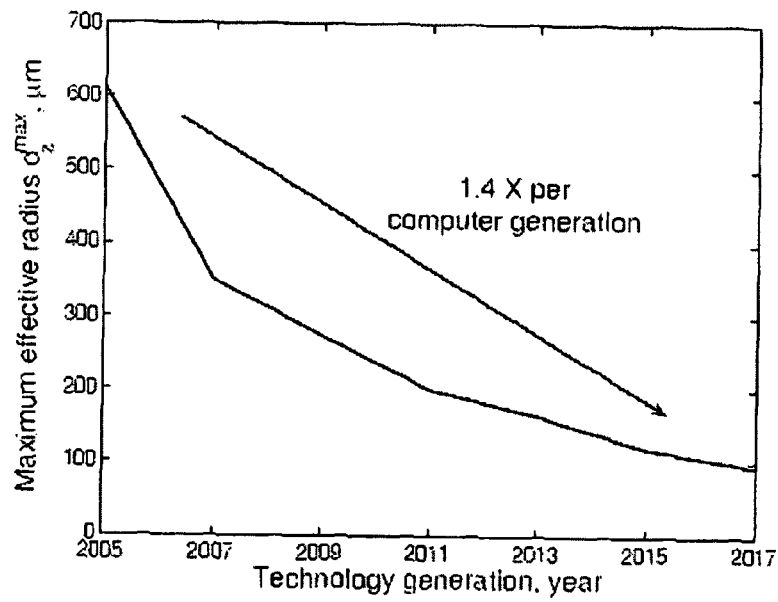
FIG. 2 shows a projection of the maximum effective radius as determined by the target impedance $d_Z^{max}$ for future technology generations.

Neglecting the parasitic capacitance, the impedance of a unit length wire is $Z'(\omega)=r+j\omega l$, where r and/are the resistance and inductance per length, respectively, and ω is an equivalent frequency, as determined by the rise time of the current load. The inductance l is the effective inductance per unit length of the power distribution grid, incorporating both the partial self-inductance and mutual coupling among the lines. The target impedance of the metal line of a particular length is therefore $$Z(\omega)=Z'(\omega) \times d, \quad (1)$$

where $Z'(\omega)$ is the impedance of a unit length metal line, and d is the distance between the decoupling capacitor and the current load. Substituting the expression for the target impedance $Z_{target}$ presented in M. Popovich and E. G. Friedman, "Decoupling Capacitors for Multi-Voltage Power Distribution Systems," *IEEE Transactions on Very Large Scale Integration (VLSI) Systems*, Vol. 14, No. 3, pp. 217-228, March 2006, into (1), the maximum effective radius $d_Z^{max}$ between the decoupling capacitor and the current load is $$d_Z^{max} = \frac{Z_{target}}{Z'(\omega)} = \frac{V_{dd} \times \text{Ripple}}{I \times \sqrt{r^2 + \omega^2 l^2}}, \quad (2)$$

where $\sqrt{r^2+\omega^2 l^2}$ denotes the magnitude of the impedance of a unit length wire. Note that the maximum effective radius as determined by the target impedance is inversely proportional to the magnitude of the current load and the impedance of a unit length line. Also note that the per length resistance r and inductance l account for the ESR and ESL of an on-chip decoupling capacitor. The maximum effective radius as determined by the target impedance decreases rapidly with each technology generation (a factor of 1.4, on average, per computer generation), as shown in FIG. 2, which shows a projection of the maximum effective radius as determined by the target impedance $d_Z^{max}$ for future technology generations: $I_{max}$=10 mA, $V_{dd}$=1V, and Ripple=0.1. Global on-chip interconnects are assumed, modeling the highly optimistic scenario. The maximum effective radius as determined by the target impedance is expected to decrease at an alarming rate (a factor of 1.4 on average per computer generation). Also note that in a meshed structure, multiple paths between any two points are added in parallel. The maximum effective distance corresponding to $Z_{target}$ is, therefore, larger than the maximum effective distance of a single line, as discussed below. The maximum effective radius is defined in this disclosure as follows:

Definition 1: The effective radius of an on-chip decoupling capacitor is the maximum distance between the current load (power supply) and the decoupling capacitor for which the capacitor is capable of providing sufficient charge to the current load, while maintaining the overall power distribution noise below a tolerable level.

Figure 3:
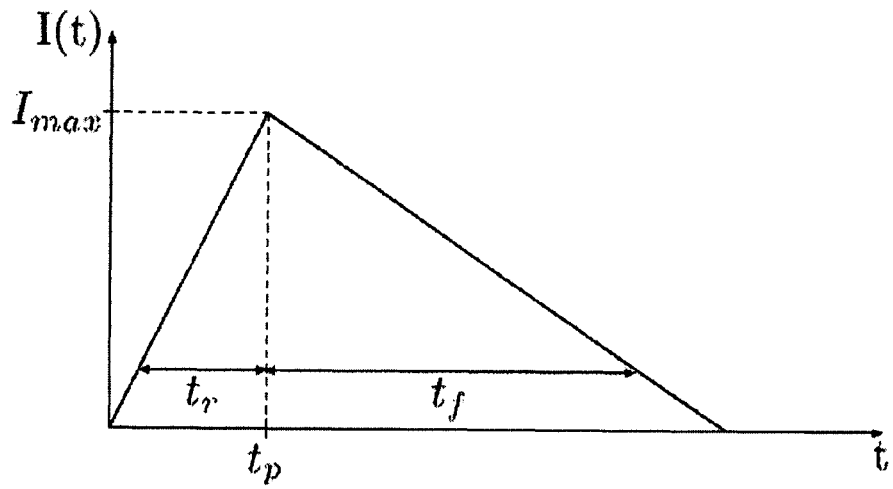
FIG. 3 shows a linear approximation of the current demand of a power distribution network by a current source.

The estimation of required on-chip decoupling capacitance will now be disclosed. To estimate the on-chip decoupling capacitance required to support a specific local current demand, for simplicity without loss of generality, the current load is modeled as a triangular current source. The magnitude of the current source increases linearly, reaching the maximum current $I_{max}$ at peak time $t_p$. The magnitude of the current source decays linearly, becoming zero at $t_f$, as shown in FIG. 3, which shows a linear approximation of the current demand of a power distribution network by a current source. The magnitude of the current source reaches the maximum current $I_{max}$ at peak time $t_p$. $t_r$ and $t_f$ denote the rise and fall time of the current load, respectively. The on-chip power distribution network is modeled as a series RL circuit. To qualitatively illustrate the proposed methodology for placing on-chip decoupling capacitors based on the maximum effective radii, a single decoupling capacitor with a single current load is assumed to mitigate the voltage fluctuations at the P/G terminals.

The total charge $Q_{dis}$ required to satisfy the current demand during a switching event is modeled as the sum of the area of two triangles (see FIG. 3). Since the required charge is provided by an on-chip decoupling capacitor, the voltage across the capacitor during discharge drops below the initial power supply voltage. The required charge during the entire switching event is thus $$Q_{dis}^f = \frac{I_{max} \times (t_r + t_f)}{2} = C_{dec} \times (V_{dd} - V_C^f), \quad (3)$$

where $I_{max}$ is the maximum magnitude of the current load of a specific circuit block for which the decoupling capacitor is allocated, $t_r$ and $t_f$ are the rise and fall time, respectively, $C_{dec}$ is the decoupling capacitance, $V_{dd}$ is the power supply voltage, and $V_C^f$ is the voltage across the decoupling capacitor after the switching event. In the general case with an a priori determined current profile, the required charge can be estimated as the integral of $I_{load}(t)$ from 0 to $t_f$. Note that since there is no current after switching, the voltage at the current load is equal to the voltage across the decoupling capacitor.

The voltage fluctuations across the P/G terminals of a power delivery system should not exceed the maximum level (usually 10% of the power supply voltage) to guarantee fault-free operation. Thus, $$V_C^f \cong V_{load}^f \geq 0.9 V_{dd}. \quad (4)$$

Substituting (4) into (3) and solving for $C_{dec}$, the minimum on-chip decoupling capacitance required to support the current demand during a switching event is $$C_{dec}^f \geq \frac{I_{max} \times (t_r + t_f)}{0.2 V_{dd}}, \quad (5)$$

where $C_{dec}^f$ is the decoupling capacitance required to support the current demand during an entire switching event.

Note that (5) is applicable only to the case where the voltage drop at the end of the switching event is larger than the voltage drop at the peak time $t_p$ $$\left(IR \gg L \frac{dI}{dt}\right).$$

Figure 4:
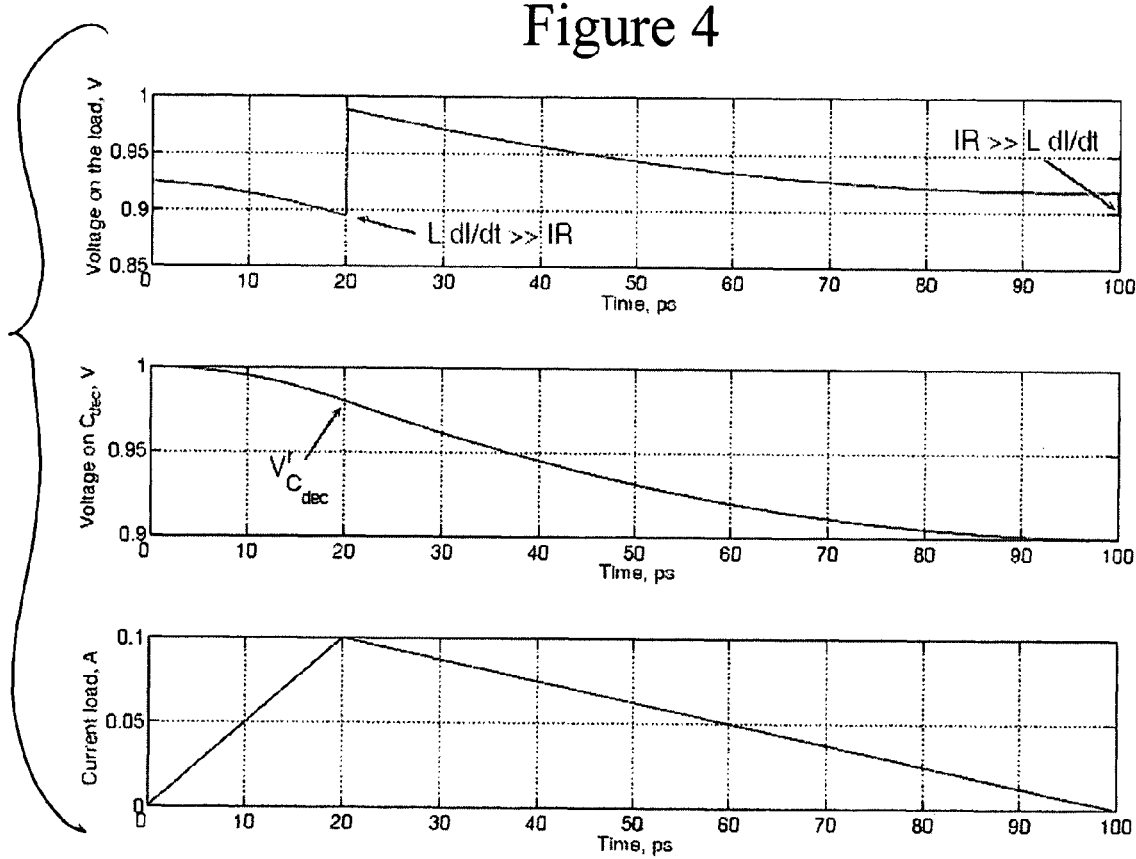
FIG. 4 shows power distribution noise during discharge of an on-chip decoupling capacitor.

Alternatively, the minimum voltage at the load is determined by the resistive drop and the parasitic inductance can be neglected. This phenomenon can be explained as follows. The voltage drop as seen at the current load is caused by current flowing through the parasitic resistance and inductance of the on-chip power distribution system. The resulting voltage fluctuations are the sum of the ohmic IR voltage drop, inductive $$L \frac{dI}{dt}$$

voltage drop, and the voltage drop across the decoupling capacitor at $t_p$. A critical parasitic RL impedance, therefore, exists for any given set of rise and fall times. Beyond this critical impedance, the voltage drop at the load is primarily caused by the inductive noise $$\left(L \frac{dI}{dt} \gg IR\right),$$

as shown in FIG. 4. FIG. 4 shows power distribution noise during discharge of an on-chip decoupling capacitor: $I_{max}$=100 mA, $V_{dd}$=1 V, $t_r$=20 ps, $t_f$=80 ps, R=100 mΩ, L=15 pH, and $C_{dec}$=50 pF. For these parameters, the parasitic impedance of the metal lines connecting the decoupling capacitor to the current load is larger than the critical impedance. The inductive noise therefore dominates the resistive noise and (5) underestimates the required decoupling capacitance. The resulting voltage drop on the power terminal of a current load is therefore larger than the maximum tolerable noise. The decoupling capacitor should therefore be increased in the case of dominant inductive noise to reduce the voltage drop across the capacitor during the rise time $V_C^r$, lowering the magnitude of the power noise.

The charge $Q_{dis}^r$ required to support the current demand during the rise time of the current load is equal to the area of the triangle formed by $I_{max}$ and $t_r$. The required charge is provided by the on-chip decoupling capacitor. The voltage across the decoupling capacitor drops below the power supply level by $\Delta V_C^r$. The required charge during $t_r$ is $$Q_{dis}^r = \frac{I_{max} \times t_r}{2} = C_{dec} \times \Delta V_C^r, \quad (6)$$

where $Q_{dis}^r$ is the charge drawn by the current load during $t_r$ and $\Delta V_C^r$ is the voltage drop across the decoupling capacitor at $t_p$. In the general case with a given current profile, the required charge can be estimated as the integral of $I_{load}(t)$ from 0 to $t_r$. From (6), $$\Delta V_C^r = \frac{I_{max} \times t_r}{2 C_{dec}}. \quad (7)$$

By time $t_p$, the voltage drop as seen from the current load is the sum of the ohmic IR drop, the inductive $$L \frac{dI}{dt}$$

drop, and the voltage drop across the decoupling capacitor. Alternatively, the power noise is further increased by the voltage drop $\Delta V_C^r$. In this case, the voltage at the current load is $$V_{load}^r = V_{dd} - I \times R - L \frac{dI}{dt} - \Delta V_C^r, \quad (8)$$

where R and L are the parasitic resistance and inductance of the P/G lines, respectively. Linearly approximating the current load, dI is assumed equal to $I_{max}$ and dt to $t_r$. Note that the last term in (8) accounts for the voltage drop $\Delta V_C^r$ across the decoupling capacitor during the rise time of the current at the load.

Assuming that $V_{load}^r \geq 0.9 V_{dd}$, substituting (7) into (8), and solving for $C_{dec}$, the minimum on-chip decoupling capacitance to support the current demand during $t_r$ is $$C_{dec}^r \geq \frac{I_{max} \times t_r}{2\left(0.1 V_{dd} - I \times R - L\frac{dI}{dt}\right)}. \quad (9)$$

where $C_{dec}^r$ is the required on-chip decoupling capacitance to support the current demand during the rise time $t_r$. Note that if $$L\frac{dI}{dt} \gg IR,$$

$C_{dec}$ is excessively large. The voltage drop at the end of the switching event is hence always smaller than the maximum tolerable noise.

Also note that, as opposed to (5), (9) depends upon the parasitic impedance of the on-chip power distribution system. Alternatively, in the case of the dominant inductive noise, the required charge released by the decoupling capacitor is determined by the parasitic resistance and inductance of the P/G lines connecting the decoupling capacitor to the current load. Assuming the impedance of a single line, the critical line length $d_{crit}$ can be determined by setting $C_{dec}^r$ equal to $C_{dec}^f$, $$\frac{I_{max} \times t_r}{\left(0.1 V_{dd} - Ird_{crit} - ld_{crit}\frac{dI}{dt}\right)} = \frac{I_{max} \times (t_r + t_f)}{0.1 V_{dd}}. \quad (10)$$

Solving (10) for $d_{crit}$, $$d_{crit} = \frac{0.1 V_{dd}\left(1 - \frac{t_r}{t_r + t_f}\right)}{Ir + l\frac{dI}{dt}}. \quad (11)$$

Figure 5:
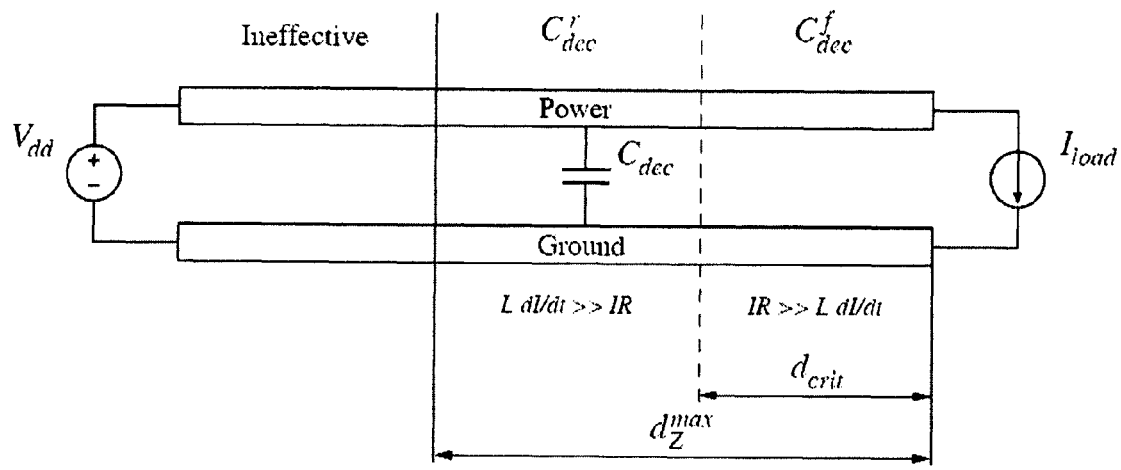
FIG. 5 shows a critical line length of an interconnect between a decoupling capacitor and a current load.

For a single line connecting a current load to a decoupling capacitor, the minimum required on-chip decoupling capacitor is determined by (5) for lines shorter than $d_{crit}$ and by (9) for lines longer than $d_{crit}$, as illustrated in FIG. 5, which shows the critical line length of an interconnect between a decoupling capacitor and a current load. The minimum required on-chip decoupling capacitance is determined by (5) for lines shorter than $d_{crit}$ and by (9) for lines longer than $d_{crit}$. The decoupling capacitor is ineffective beyond the maximum effective radius as determined by the target impedance $d_Z^{max}$. Note that for a line length equal to $d_{crit}$, (5) and (9) result in the same required capacitance. Also note that the maximum length of a single line is determined by (2). A closed-form solution for the critical line length has not been developed for the case of multiple current paths existing between the current load and a decoupling capacitor. In this case, the impedance of the power grid connecting a decoupling capacitor to a current load is extracted and compared to the critical impedance. Either (5) or (9) is utilized to estimate the required on-chip decoupling capacitance.

Figure 6:
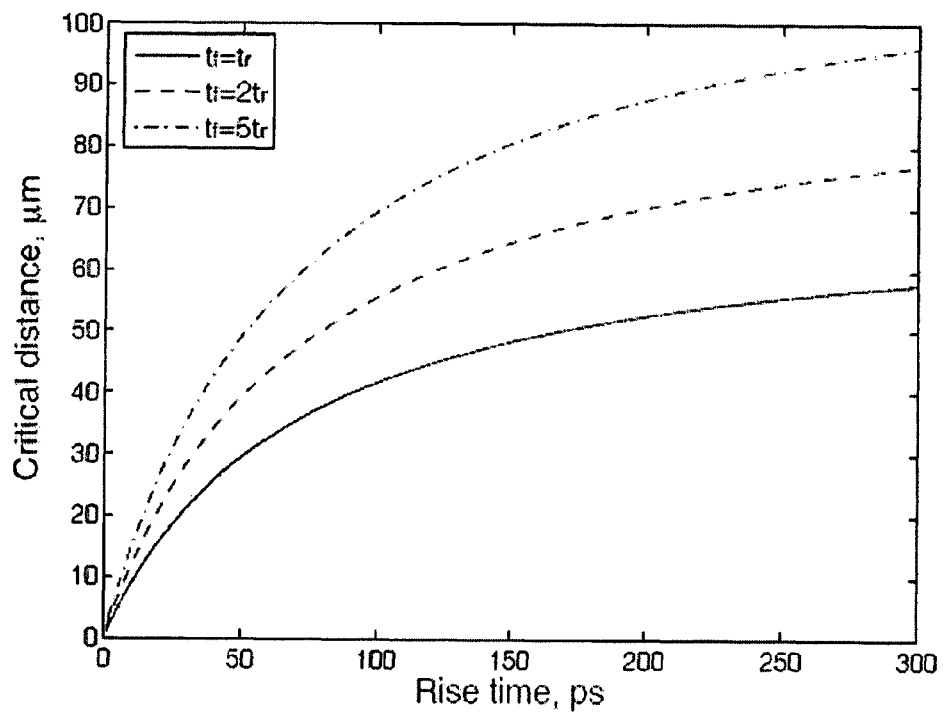
FIG. 6 shows the dependence of the critical line length $d_{crit}$ on the rise time of the current load.

The dependence of the critical line length $d_{crit}$ on the rise time $t_r$ of the current load as determined by (11) is depicted in FIG. 6, which shows the dependence of the critical line length $d_{crit}$ on the rise time of the current load: $I_{max}=0.1$ A, $V_{dd}=1$ V, $r=0.007$ $\Omega/\mu m$, and $l=0.5$ pH/$\mu m$. Note that $d_{crit}$ is determined by $$\frac{t_r}{t_f},$$

increasing with larger $t_f$. The critical line length will shrink in future nanometer technologies as transition times become shorter. From FIG. 6, the critical line length decreases sub-linearly with shorter rise times. Hence, the critical line length will decrease in future nanometer technologies as the transition times become shorter, significantly increasing the required on-chip decoupling capacitance. Also note that $d_{crit}$ is determined by $$\frac{t_r}{t_f},$$

increasing with larger fall times.

Figure 7A:
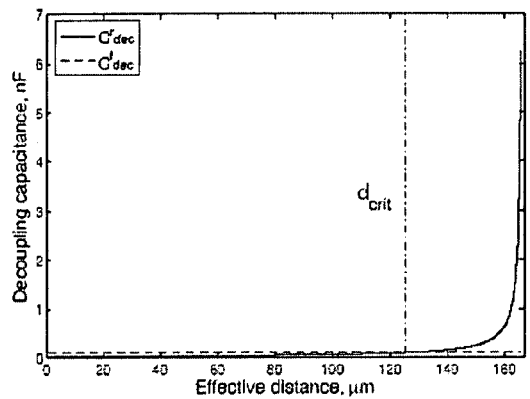
FIG. 7A shows the design space for determining the minimum required on-chip decoupling capacitance.
Figure 7B:
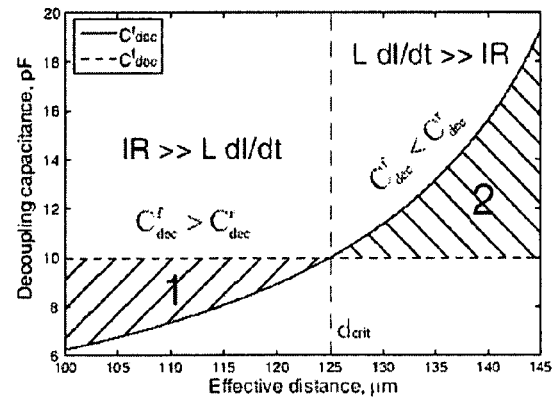
FIG. 7B shows a zoomed view from FIG. 7A.

Observe in FIG. 5 that the design space for determining the required on-chip decoupling capacitance is broken into two regions by the critical line length. The design space for determining the required on-chip decoupling capacitance ($C_{dec}^r$ and $C_{dec}^f$) is depicted in FIGS. 7A and 7B. In FIG. 7A, $I_{max}=50$ mA, $V_{dd}=1$ V, $r=0.007$ $\Omega/\mu m$, $l=0.5$ pH/$\mu m$, $t_r=100$ ps, and $t_f=300$ ps. FIG. 7A shows that the design space for determining the minimum required on-chip decoupling capacitance is broken into two regions by $d_{crit}$. FIG. 7B shows the design space around $d_{crit}$. For the example parameters, the critical line length is 125 $\mu m$. In region 1, $C_{dec}^f$ is greater than $C_{dec}^r$ and does not depend upon the parasitic impedance. In region 2, however, $C_{dec}^r$ dominates, increasing rapidly with distance between the decoupling capacitor and the current load. Note that the required on-chip decoupling capacitance $C_{dec}^r$ depends upon the parasitic impedance of the metal lines connecting the decoupling capacitor to the current load. Thus, for lines longer than $d_{crit}$, $C_{dec}^r$ increases exponentially as the separation between the decoupling capacitor and the current load increases, as shown in FIGS. 7A and 7B. Also note that for lines shorter than $d_{crit}$, the required on-chip decoupling capacitance does not depend upon the parasitic impedance of the power distribution grid. Alternatively, in the case of the dominant resistive drop, the required on-chip decoupling capacitance $C_{dec}^f$ is constant and greater than $C_{dec}^r$ (see region 1 in FIG. 7B). If $$L\frac{dI}{dt}$$

noise dominates the IR noise (the line length is greater than $d_{crit}$), the required on-chip decoupling capacitance $C_{dec}^r$ increases substantially with line length and is greater than $C_{dec}^f$ (see region 2 in FIG. 7B). Conventional techniques therefore significantly underestimate the required decoupling capacitance in the case of the dominant inductive noise. Note that in region 1, the parasitic impedance of the metal lines connecting a decoupling capacitor to the current load is not important. In region 2, however, the parasitic impedance of the P/G lines should be considered. A tradeoff therefore exists between the size of $C_{dec}^r$ and the distance between the decoupling capacitor and the current load. As $C_{dec}{}^r$ is placed closer to the current load, the required capacitance can be significantly reduced.

The effective radius as determined by charge time will now be disclosed. Once discharged, a decoupling capacitor must be fully charged to support the current demands during the following switching event. If the charge on the capacitor is not fully restored during the relaxation time between two consecutive switching events (the charge time), the decoupling capacitor will be gradually depleted, becoming ineffective after several clock cycles. A maximum effective radius, therefore, exists for an on-chip decoupling capacitor as determined during the charging phase for a target charge time. Similar to the effective radius based on the target impedance presented herein, an on-chip decoupling capacitor should be placed in close proximity to the power supply (power pins) to be effective.

Figure 8:
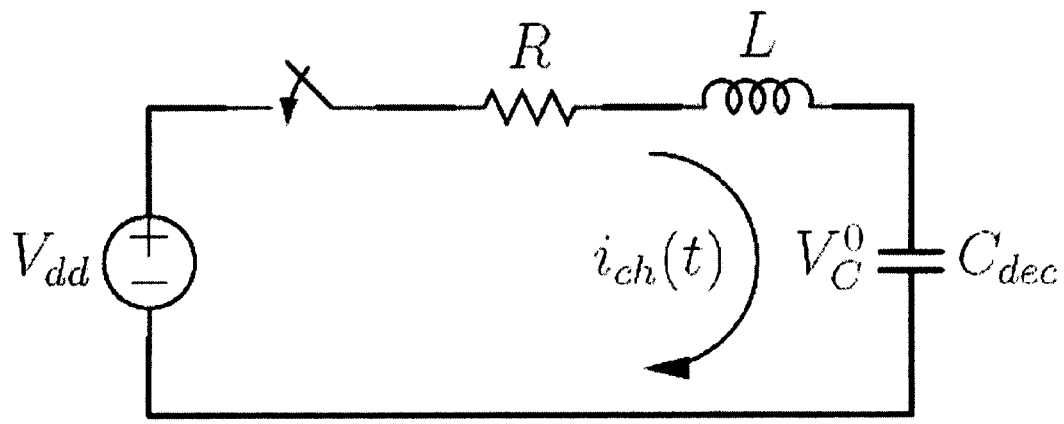
FIG. 8 shows a circuit charging an on-chip decoupling capacitor.

To determine the current flowing through a decoupling capacitor during the charging phase, the parasitic impedance of a power distribution system is modeled as a series RL circuit between the decoupling capacitor and the power supply, as shown in FIG. 8. The parasitic impedance of the power distribution system connecting the decoupling capacitor to the power supply is modeled by a series RL circuit. When the discharge is completed, the switch is closed and the charge is restored on the decoupling capacitor. The initial voltage $V_C^0$ across the decoupling capacitor is determined by the maximum voltage drop during discharge.

For the circuit shown in FIG. 8, the KVL equation for the current in the circuit is $$L\frac{di_{ch}}{dt} + Ri_{ch} + \frac{1}{C_{dec}}\int i_{ch} dt = V_{dd}. \quad (12)$$

Differentiating (12), $$L\frac{d^2 i_{ch}}{dt^2} + R\frac{di_{ch}}{dt} + \frac{1}{C_{dec}} i_{ch} = 0. \quad (13)$$

Equation (13) is a second order linear differential equation with the characteristic equation, $$s^2 + \frac{R}{L}s + \frac{1}{LC_{dec}} = 0. \quad (14)$$

The general solution of (13) is $$i_{ch}(t) = K_1 e^{s_1 t} + K_2 e^{s_2 t}, \quad (15)$$

where $s_1$ and $s_2$ are the roots of (14), $$s_{1,2} = -\frac{R}{2L} \pm \sqrt{\left(\frac{R}{2L}\right)^2 - \frac{1}{LC_{dec}}}. \quad (16)$$

Note that (15) represents the solution of (13) as long as the system is overdamped. The damping factor is therefore greater than one, i.e., $$\left(\frac{R}{L}\right)^2 > \frac{4}{LC}. \quad (17)$$

For a single line, from (17), the critical line length resulting in an overdamped system is $$D > \frac{4l}{r^2 C_{dec}}, \quad (18)$$

where $C_{dec}$ is the on-chip decoupling capacitance, and l and r are the per length inductance and resistance, respectively. Inequality (18) determines the critical length of a line resulting in an overdamped system. Note that for typical values of r and l in a 90 nm CMOS technology, a power distribution system with a decoupling capacitor is overdamped for on-chip interconnects longer than several micrometers. Equation (15) is therefore a general solution of (13) for a scaled CMOS technology.

Initial conditions are applied to determine the arbitrary constants $K_1$ and $K_2$ in (15). The current charging the decoupling capacitor during the charging phase is $$i_{ch}(t) = \frac{I_{max}(t_r + t_f)}{4LC_{dec}\sqrt{\left(\frac{R}{2L}\right)^2 - \frac{1}{LC_{dec}}}} \quad (19)$$

$$\times \left\{ \exp\left[\left(-\frac{R}{2L} + \sqrt{\left(\frac{R}{2L}\right)^2 - \frac{1}{LC_{dec}}}\right)t\right] \right.$$

$$\left. - \exp\left[\left(-\frac{R}{2L} - \sqrt{\left(\frac{R}{2L}\right)^2 - \frac{1}{LC_{dec}}}\right)t\right] \right\}.$$

The voltage across the decoupling capacitor during the charging phase can be determined by integrating (19) from zero to the charge time, $$V_C(t) = \frac{1}{C_{dec}} \int_0^{t_{ch}} i_{ch}(t) dt, \quad (20)$$

where $t_{ch}$ is the charge time, and $V_C(t)$ and $i_{ch}(t)$ are the voltage across the decoupling capacitor and the current flowing through the decoupling capacitor during the charging phase, respectively. Substituting (19) into (20) and integrating from zero to $t_{ch}$, the voltage across the decoupling capacitor during the charging phase is $$V_{C_{dec}}(t_{ch}) = \frac{I_{max}(t_r + t_f)}{4C_{dec}^2 L\sqrt{\left(\frac{R}{2L}\right)^2 - \frac{1}{LC_{dec}}}} \quad (21)$$

$$\times \left\{ \frac{\exp\left[\left(-\frac{R}{2L} + \sqrt{\left(\frac{R}{2L}\right)^2 - \frac{1}{LC_{dec}}}\right)t_{ch}\right] - 1}{-\frac{R}{2L} + \sqrt{\left(\frac{R}{2L}\right)^2 - \frac{1}{LC_{dec}}}} \right.$$

-continued $$+ \frac{1 - \exp\left[\left(-\frac{R}{2L} - \sqrt{\left(\frac{R}{2L}\right)^2 - \frac{1}{LC_{dec}}}\right)t_{ch}\right]}{-\frac{R}{2L} - \sqrt{\left(\frac{R}{2L}\right)^2 - \frac{1}{LC_{dec}}}}\right\}.$$

Figure 9:
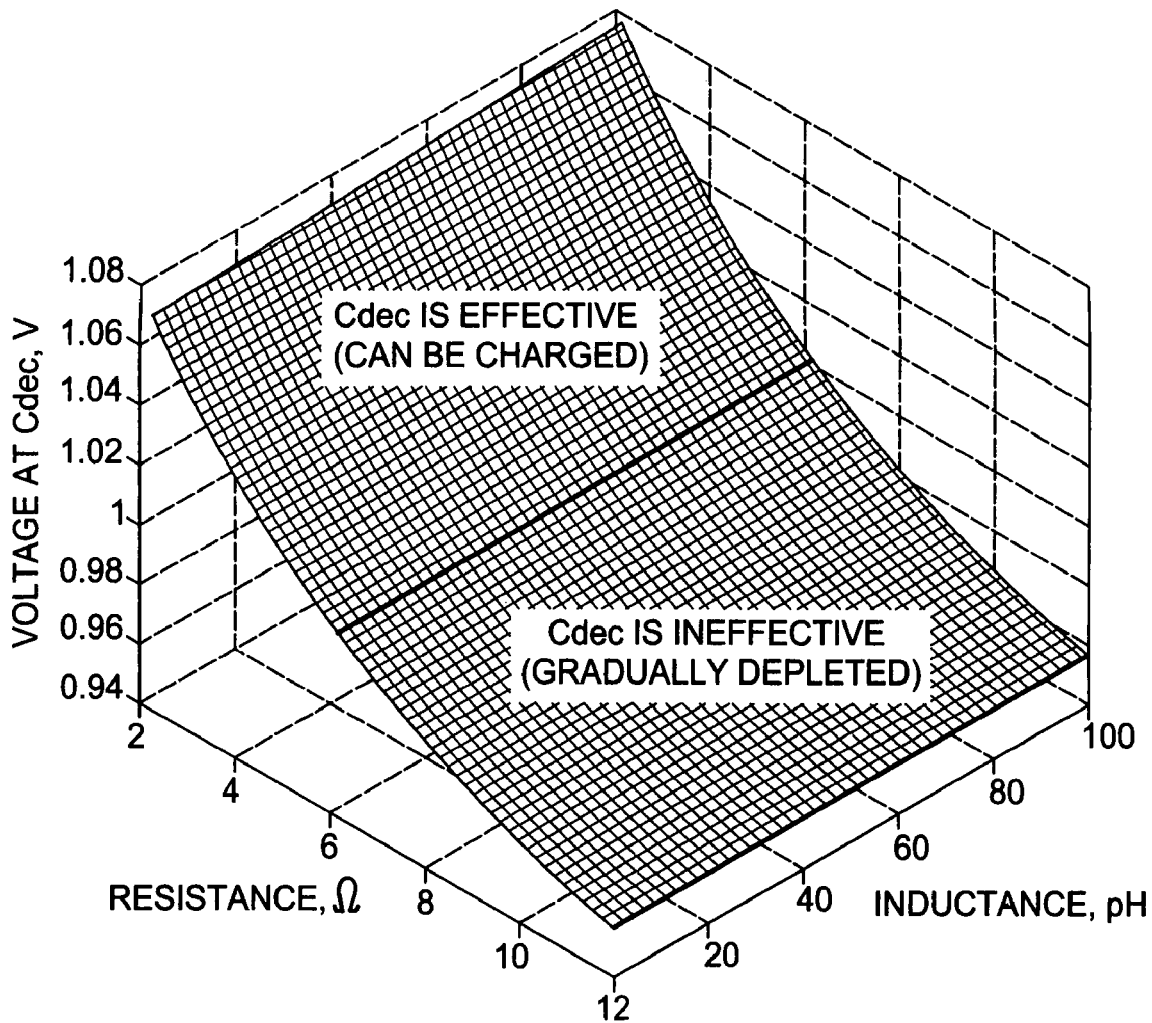
FIG. 9 shows a design space for determining the maximum tolerable parasitic resistance and inductance of a power distribution grid during the charging phase.

Observe that the criterion for estimating the maximum effective radius of an on-chip decoupling capacitor as determined by the charge time is transcendental. A closed-form expression is therefore not available for determining the maximum effective radius of an on-chip decoupling capacitor during the charging phase. Thus from (21), a design space can be graphically described in order to determine the maximum tolerable resistance and inductance that permit the decoupling capacitor to be recharged within a given $t_{ch}$, as shown in FIG. 9. FIG. 9 shows the design space for determining the maximum tolerable parasitic resistance and inductance of a power distribution grid: $I_{max}$=100 mA, $t_r$=100 ps, $t_f$=300 ps, $C_{dec}$=100 pF, $V_{dd}$=1 volt, and $t_{ch}$=400 ps. For a target charge time, the maximum resistance and inductance result in a voltage across the decoupling capacitor that is greater or equal to the power supply voltage (region above the dark line). Note that the maximum voltage across the decoupling capacitor is the power supply voltage. A design space that results in a voltage greater than the power supply means that the charge on the decoupling capacitor can be restored within $t_{ch}$. The parasitic resistance and inductance should be maintained below the maximum tolerable values, permitting the decoupling capacitor to be charged during the relaxation time.

Note that as the parasitic resistance of the power delivery network decreases, the voltage across the decoupling capacitor increases exponentially. In contrast, the voltage across the decoupling capacitor during the charging phase is almost independent of the parasitic inductance, slightly increasing with inductance. This phenomenon is due to the behavior that an inductor resists sudden changes in the current. Alternatively, an inductor maintains the charging current at a particular level for a longer time. Thus, the decoupling capacitor is charged faster.

Figure 10:
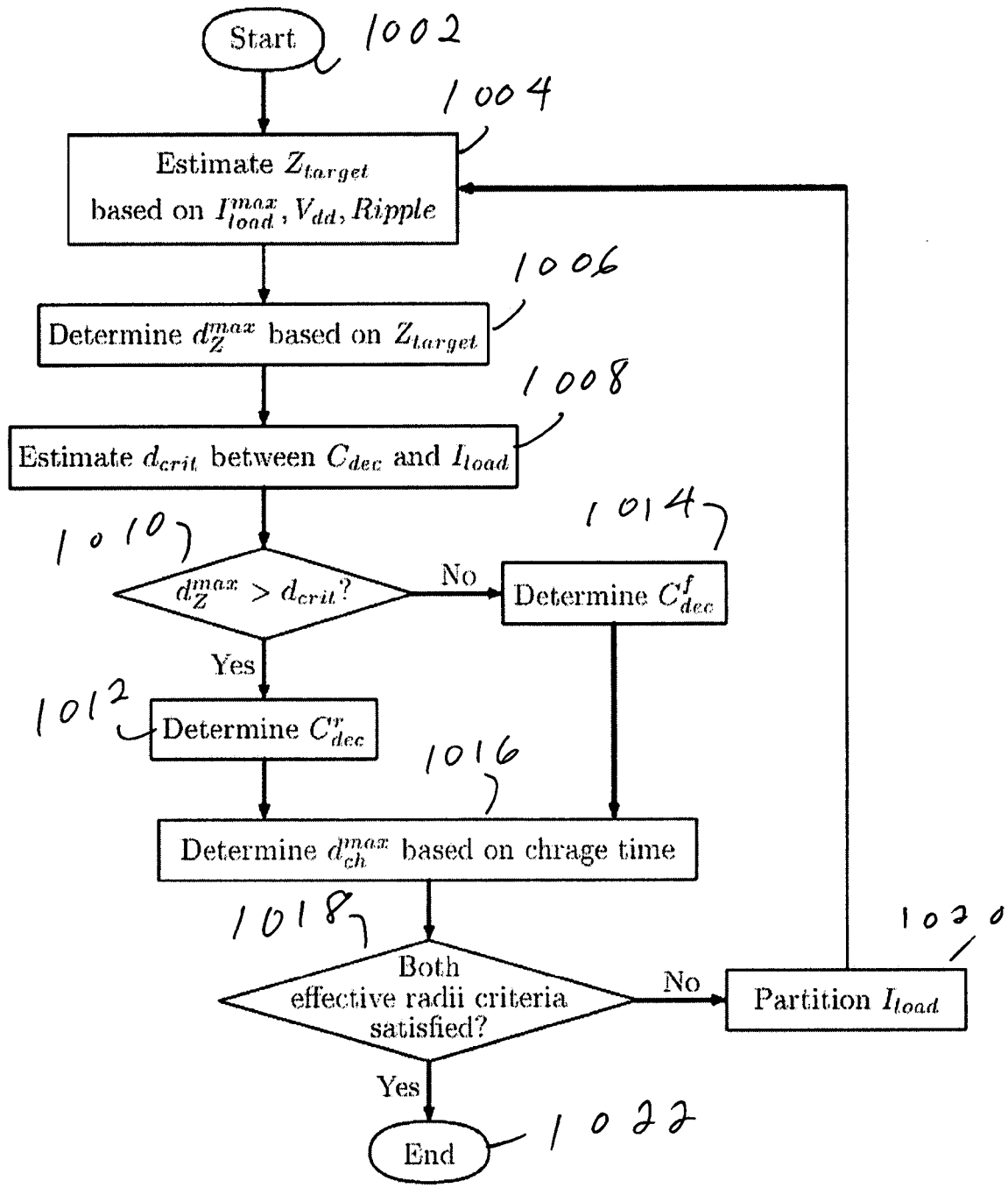
FIG. 10 shows a design flow for placing on-chip decoupling capacitors.

An overall design methodology for placing on-chip decoupling capacitors is illustrated in FIG. 10. The process starts in step 1002. The target impedance is estimated in step 1004. The maximum effective radius based on the target impedance is determined in step 1006 from (2) for a particular current load (circuit block), power supply voltage, and allowable ripple. The minimum required on-chip decoupling capacitance is estimated to support the required current demand. If the resistive drop is larger than the inductive drop, (5) is used to determine the required on-chip decoupling capacitance. If $$L\frac{dI}{dt}$$

noise dominates, the on-chip decoupling capacitance is determined by (9). In the case of a single line connecting a decoupling capacitor to a current load, the critical wire length is determined in step 1008 by (11). If it is determined in step 1010 that $d_Z^{max}$ as determined in step 1006 is greater than $d_{crit}$ as determined in step 1008, then, in step 1012, (9) is used. Otherwise, in step 1014, (5) is used.

Figure 11:
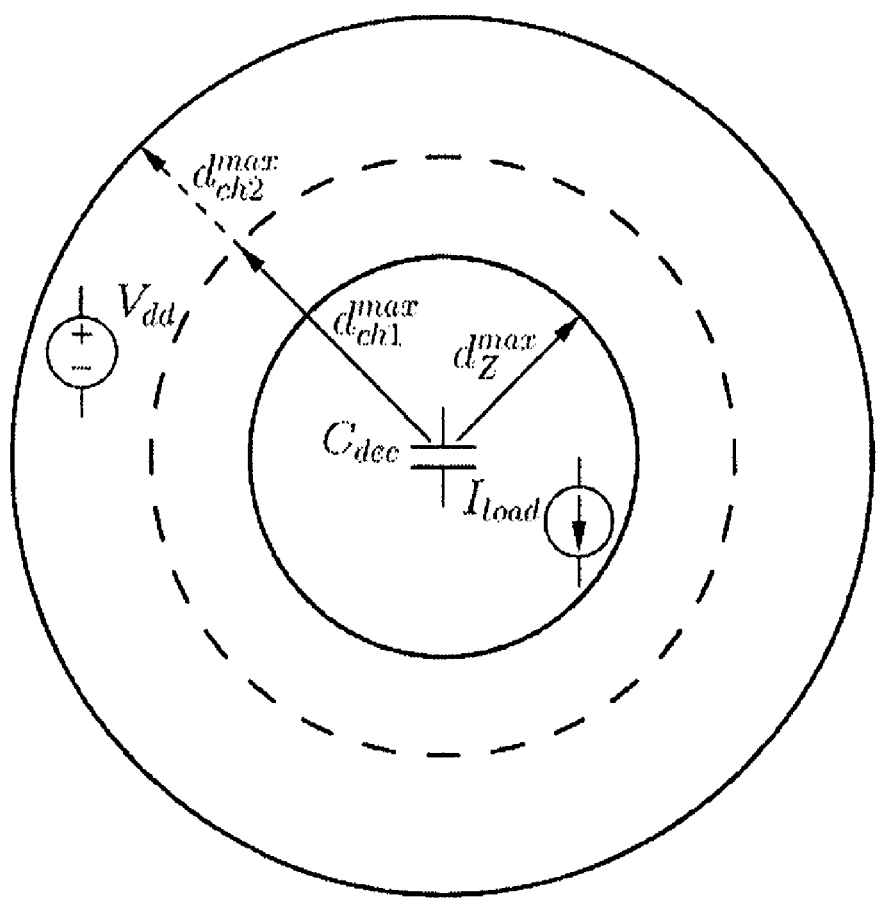
FIG. 11 shows the effective radii of an on-chip decoupling capacitor.

The maximum effective distance based on the charge time is determined from (21) in step 1016. Note that (21) results in a range of tolerable parasitic resistance and inductance of the metal lines connecting the decoupling capacitor to the power supply. Also note that the on-chip decoupling capacitor should be placed such that both the power supply and the current load are located inside their effective radii, as shown in FIG. 11. The maximum effective radius as determined by the target impedance $d_Z^{max}$ does not depend on the decoupling capacitance. The maximum effective radius as determined by the charge time is inversely proportional to $C_{dec}^2$. If the power supply is located outside the effective radius $d_{ch1}^{max}$, the current load should be partitioned, resulting in a smaller decoupling capacitor and, therefore, an increased effective distance $d_{ch2}^{max}$. Returning to FIG. 10, if it is determined in step 1018 that this allocation is not possible, the current load (circuit block) should be partitioned in step 1020 into several blocks and the on-chip decoupling capacitors should be allocated for each block, satisfying both effective radii requirements, whereupon the process returns to step 1004. Once both effective radii criteria are satisfied, the process ends in step 1022.

The effective radius as determined by the target impedance does not depend upon the decoupling capacitance. In contrast, the effective radius as determined by the charge time is inversely proportional to $C_{dec}^2$. The on-chip decoupling capacitors should be distributed across the circuit to provide sufficient charge for each functional unit.

A model of an on-chip power distribution network will now be presented. In order to determine the effective radii of an on-chip decoupling capacitor and the effect on the noise distribution, a model of a power distribution network is required. On-chip power distribution networks in high performance ICs are commonly modeled as a mesh. Early in the design process, minimal physical information characterizing the P/G structure is available. A simplified model of a power distribution system is therefore appropriate. For simplicity, equal segments within a mesh structure are assumed. The current demands of a particular module are modeled as current sources with equivalent magnitude and switching activities. The current load is located at the center of a circuit module which determines the connection point of the circuit module to the power grid. The parasitic resistance and inductance of the package are also included in the model as an equivalent series resistance $R_p$ and inductance $L_p$. Note that the parasitic capacitance of a power distribution grid provides a portion of the decoupling capacitance, providing additional charge to the current loads. The on-chip decoupling capacitance intentionally added to the IC is typically more than an order of magnitude greater than the parasitic capacitance of the on-chip power grid. The parasitic capacitance of the power delivery network is, therefore, neglected.

Figure 12:
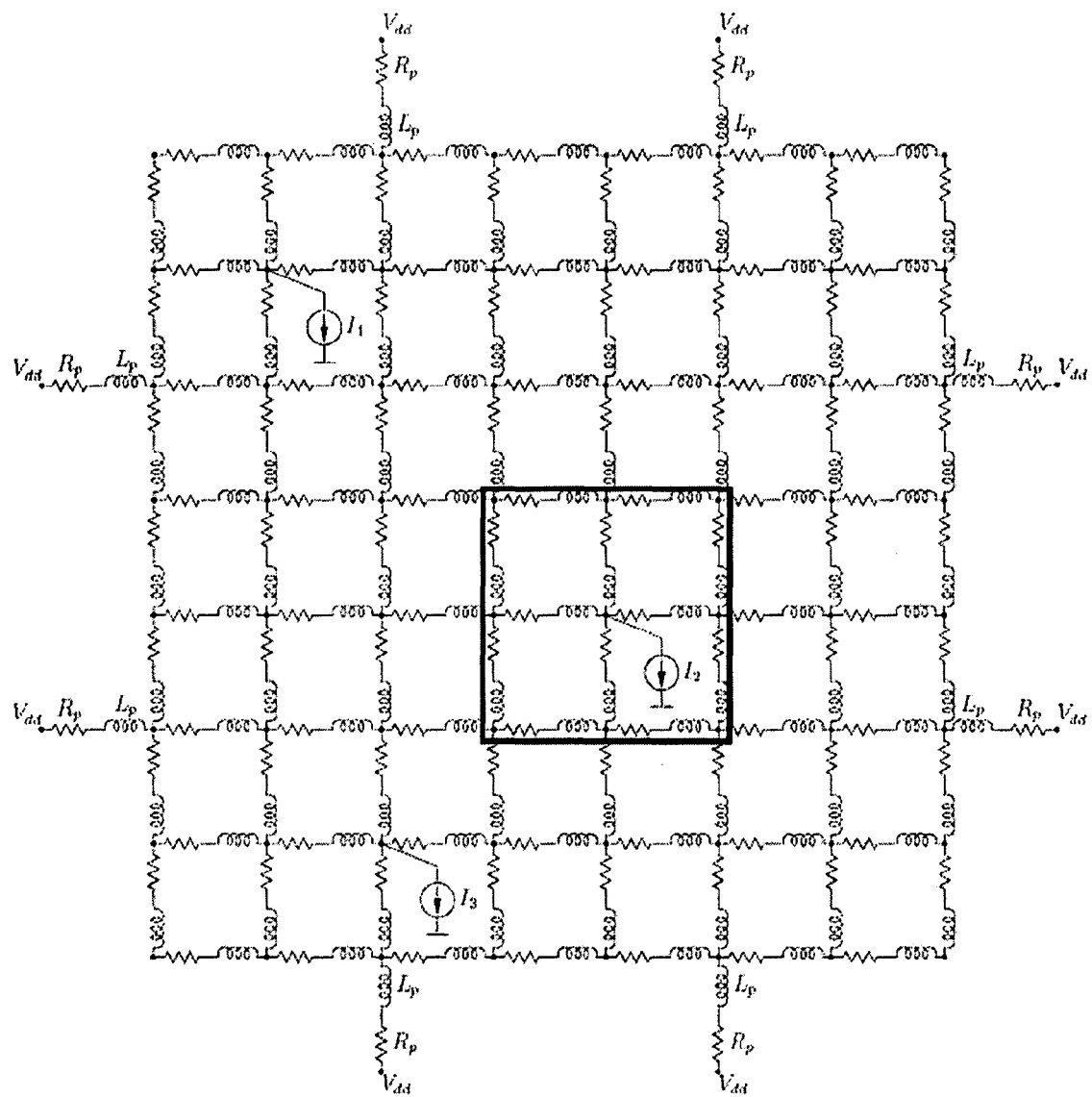
FIG. 12 shows a model of a power distribution network.
Figure 13:
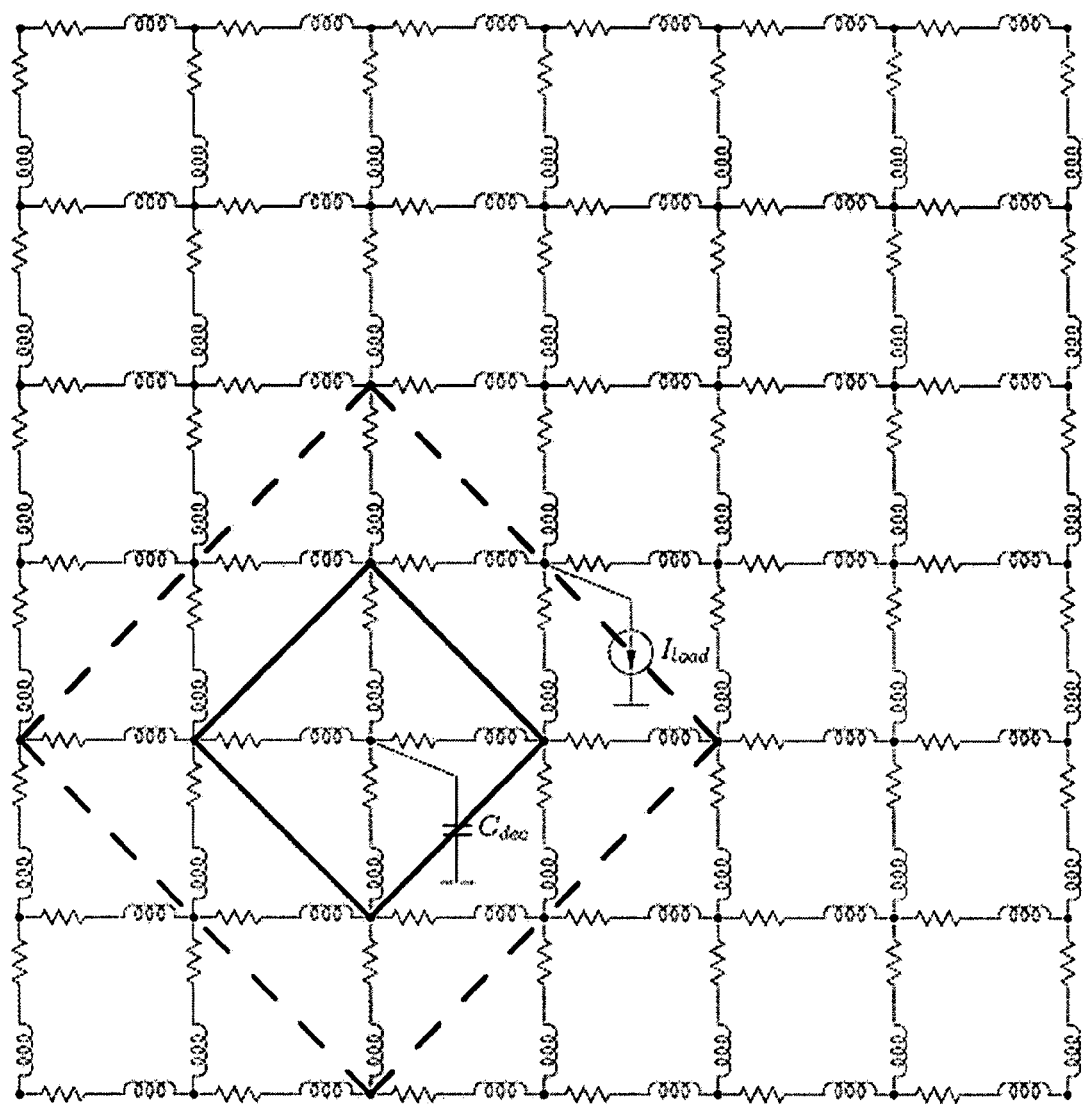
FIG. 13 shows the effective radii of an on-chip decoupling capacitor in a power distribution network.

Typical effective radii of an on-chip decoupling capacitor is in the range of several hundreds of micrometers. In order to determine the location of an on-chip decoupling capacitor, the size of each RL mesh segment should be much smaller than the effective radii. In modern high performance ICs such as microprocessors with die sizes approaching 1.5 inches by 1.5 inches, a fine mesh is infeasible to simulate. In the case of a coarse mesh, the effective radii are smaller than the size of each segment. The location of each on-chip decoupling capacitor, therefore, cannot be accurately determined. To resolve this dilemma, the accuracy of the capacitor location can be traded off with the complexity of the power distribution network. A hot spot (an area where the power supply voltage drops below the minimum tolerable level) is first determined based on a coarse mesh, as shown in FIG. 12. The on-chip power delivery system is modeled as a distributed RL mesh with seven by seven equal segments. The current loads are modeled as current sources with equivalent magnitude and switching activities. $R_p$ and $L_p$ denote the parasitic resistance and inductance of the package, respectively. The rectangle denotes a "hot" spot—the area where the power supply voltage drops below the minimum tolerable level. A finer mesh is used next within each hot spot to accurately estimate the effective radii of the on-chip decoupling capacitor. Note that in a mesh structure, each maximum effective radius is the Manhattan distance between two points. Disagreeing with FIG. 11, each overall effective radius is actually shaped more like a diamond, as illustrated in FIG. 13.

In modern high performance ICs, up to 3000 I/O pins can be necessary. Only half of the I/O pads are typically used to distribute power. The other half is dedicated to signaling. Assuming an equal distribution of power and ground pads, a quarter of the total number of pads is typically available for power or ground delivery. For high performance ICs with die sizes of 1.5 inches by 1.5 inches inside a flip-chip package, the distance between two adjacent power or ground pads is about 1300 μm. By modeling the flip chip area array by a six by six distributed RL mesh, the accuracy in determining the effective radii of an on-chip decoupling capacitor is traded off with the computational complexity required to analyze the power delivery network. In this chapter, an on-chip power distribution system composed of the four closest power pins is modeled as an RL mesh of forty by forty equal segments to accurately determine the maximum effective distance of an on-chip decoupling capacitor. Note that this approach of modeling a power distribution system is applicable to ICs with both conventional low cost and advanced high performance packaging.

A case study will now be presented. The dependence of the effective radii of an on-chip decoupling capacitor on a power distribution system is described in this section to quantitatively illustrate these concepts. The load is modeled as a triangular current source with a 100 ps rise time and 300 ps fall time. The maximum tolerable ripple at the load is 10% of the power supply voltage. The relaxation time between two consecutive switching events (charge time) is 400 ps. Two scenarios are considered for determining the effective radii of an on-chip decoupling capacitor. In the first scenario, an on-chip decoupling capacitor is connected to the current load by a single line (local connectivity). In the second scenario, the on-chip decoupling capacitors are connected to the current loads by an on-chip power distribution grid (global connectivity). A flip-chip package is assumed. An on-chip power distribution system with a flip-chip pitch (the area formed by the four closest pins) is modeled as an RL distributed mesh of forty by forty equal segments to accurately determine the maximum effective distance of an on-chip decoupling capacitor. The parasitic resistance and inductance of the package (four closest pins of a flip-chip package) are also included in the model.

For a single line, the maximum effective radii as determined by the target impedance and charge time for three sets of on-chip parasitic resistances and inductances are listed in Table 1. The three scenarios listed in Table 1 represent typical values of the parasitic resistance and inductance of the top, intermediate, and bottom layers of on-chip interconnects in a 90 nm CMOS technology. In the case of the top metal layer, the maximum effective distance as determined by the target impedance is smaller than the critical distance as determined by (11). Hence, $$IR \gg L\frac{dI}{dt},$$

and the required on-chip decoupling capacitance is determined by (5). Note that the decoupling capacitance increases linearly with the current load. For a typical parasitic resistance and inductance of the intermediate and bottom layers of the on-chip interconnects, the effective radius as determined by the target impedance is longer than the critical distance $d_{crit}$. In this case, the overall voltage drop at the current load is determined by the inductive noise. The on-chip decoupling capacitance can therefore be estimated by (9).

In the case of an RL mesh, the maximum effective radii as determined by the target impedance and charge time for three sets of on-chip parasitic resistances and inductances are listed in Table 2. From (11), for the parameters listed in Table 2, the critical voltage drop is 75 mV. If the voltage fluctuations at the current load do not exceed the critical voltage, $$IR \gg L\frac{dI}{dt}$$

and the required on-chip decoupling capacitance is determined by (5).

TABLE 1

Maximum effective radii of an on-chip decoupling capacitor for a single line connecting a decoupling capacitor to a current load

| Metal Layer | Resistance (Ω/μm) | Inductance (pH/μm) | $I_{load}$ (A) | $C_{dec}$ (pF) | $d_{max}$ (μm) Z | $t_{ch}$ |
|---|---|---|---|---|---|---|
| Top | 0.007 | 0.5 | 0.01 | 20 | 310.8 | 1166 |
|  | 0.007 | 0.5 | 0.1 | 200 | 31.1 | 116 |
|  | 0.007 | 0.5 | 1 | 2000 | 3.1 | 11.6 |
| Intermediate | 0.04 | 0.3 | 0.01 | 183 | 226.2 | 24.2 |
|  | 0.04 | 0.3 | 0.1 | 1773 | 22.6 | 2.4 |
|  | 0.04 | 0.3 | 1 | 45454 | 2.3 | 0.2 |
| Bottom | 0.1 | 0.1 | 0.01 | 50000 | 99.8 | 0 |
|  | 0.1 | 0.1 | 0.1 | ∞ | 0 | 0 |
|  | 0.1 | 0.1 | 1 | ∞ | 0 | 0 |

$V_{dd}$ = 1 V, $V_{ripple}$ = 100 mV, $t_r$ = 100 ps, $t_f$ = 300 ps, $t_{ch}$ = 400 ps Note that for the aforementioned three interconnect scenarios, assuming a 10 mA current load, the maximum effective radii of the on-chip decoupling capacitor based on the target impedance and charge time are larger than forty cells (the longest distance within the mesh from the center of the mesh to the corner). The maximum effective radii of the on-chip decoupling capacitor is therefore larger than the pitch size. The decoupling capacitor can therefore be placed anywhere inside the pitch. For a 100 mA current load, the voltage fluctuations at the current load exceed the critical voltage drop. The inductive $$L\frac{dI}{dt}$$

noise dominates and the required on-chip decoupling capacitance is determined by (9).

The effective radii of an on-chip decoupling capacitor decreases linearly with current load. The optimal size of an RL distributed mesh should therefore be determined for a particular current demand. If the magnitude of the current requirements is low, the mesh can be coarser, significantly decreasing the simulation time. For a 10 mA current load, the effective radii as determined from both the target impedance and charge time are longer than the pitch size. Thus, the distributed mesh is overly fine. For a current load of 1 A, the effective radii are shorter than one cell, meaning that the distributed RL mesh is overly coarse. A finer mesh should therefore be used to accurately estimate the maximum effective radii of the on-chip decoupling capacitor. In general, the cells within the mesh should be sized based on the current demand and the acceptable computational complexity (or simulation budget). As a rule of thumb, a coarser mesh should be used on the perimeter of each grid pitch. A finer mesh should be utilized around the current loads.

Note that in both cases, $C_{dec}^r$ as determined by (9) increases rapidly with the effective radius based on the target impedance, becoming infinite at $d_Z^{max}$. In this case study, the decoupling capacitor is allocated at almost the maximum effective distance $d_Z^{max}$, simulating the worst case scenario. The resulting $C_{dec}$ is therefore significantly larger than necessary. As the decoupling capacitor is placed closer to the current load, the required on-chip decoupling capacitance as estimated by (9) can be reduced. A tradeoff therefore exists between the maximum effective distance as determined by the target impedance and the size of the minimum required on-chip decoupling capacitance (if the overall voltage drop at the current load is primarily caused by the inductive $$L\frac{dI}{dt} \text{ drop)}.$$

The effective radii listed in Table 1 are determined for a single line between the current load or power supply and the decoupling capacitor. In the case of a power distribution

TABLE 2

Maximum effective radii of an on-chip decoupling capacitor for an on-chip power distribution grid modeled as a distributed RL mesh

| Metal Layer | Resistance ($\Omega/\mu m$) | Inductance ($pH/\mu m$) | $I_{load}$ (A) | $C_{dec}$ (pF) | $d_{max}$ (cells) Z | $t_{ch}$ |
|---|---|---|---|---|---|---|
| Top | 0.007 | 0.5 | 0.01 | 20 | >40 | >40 |
|  | 0.007 | 0.5 | 0.1 | 357 | 2 | >40 |
|  | 0.007 | 0.5 | 1 | — | <1 | — |
| Intermediate | 0.04 | 0.3 | 0.01 | 20 | >40 | >40 |
|  | 0.04 | 0.3 | 0.1 | 227 | 1 | <1 |
|  | 0.04 | 0.3 | 1 | — | <1 | — |
| Bottom | 0.1 | 0.1 | 0.01 | 20 | >40 | >40 |
|  | 0.1 | 0.1 | 0.1 | — | <1 | — |
|  | 0.1 | 0.1 | 1 | — | <1 | — |

$V_{dd} = 1$ V, $V_{ripple} = 100$ mV, $t_r = 100$ ps, $t_f = 300$ ps, $t_{ch} = 400$ ps, cell size is 32.5 μm × 32.5 μm grid modeled as a distributed RL mesh, multiple paths are connected in parallel, increasing the effective radii. For instance, comparing Table 1 to Table 2, note that the maximum effective radii as determined by the target impedance are increased about three times and two times for the top metal layers with a 10 mA and 100 mA current load, respectively. Note also that for typical values of the parasitic resistance and inductance of a power distribution grid, the effective radius as determined by the target impedance is longer than the radius based on the charge time.

Also note that the maximum effective radius as determined by the charge time decreases quadratically with the decoupling capacitance. The maximum effective distance as determined by the charge time becomes impractically short for large decoupling capacitances. For the bottom metal layer, the maximum effective radius based on the charge time approaches zero. Note that the maximum effective radius during the charging phase has been evaluated for the case where the decoupling capacitor is charged to the power supply voltage. In practical applications, this constraint can be relaxed, assuming the voltage across the decoupling capacitor is several millivolts smaller than the power supply. In this case, the effective radius of the on-chip decoupling capacitor as determined by the charge time can be significantly increased.

The maximum effective radius as determined by the charge time becomes impractically short for large decoupling capacitors, making the capacitors ineffective. In this case, the decoupling capacitor should be placed closer to the current load, permitting the decoupling capacitance to be decreased. Alternatively, the current load can be partitioned into several blocks, lowering the requirements on a specific local on-chip decoupling capacitance. The parasitic impedance between the decoupling capacitor and the current load and power supply should also be reduced, if possible, increasing the maximum effective radii of the on-chip decoupling capacitors.

Design implications will now be considered. A larger on-chip decoupling capacitance is required to support increasing current demands. The maximum available on-chip decoupling capacitance, which can be placed in the vicinity of a particular circuit block, is limited however by the maximum capacitance density of a given technology. Large functional units (current loads) should therefore be partitioned into smaller blocks with local on-chip decoupling capacitors to enhance the likelihood of fault-free operation of the entire system. An important concept described in this chapter is that on-chip decoupling capacitors are a local phenomenon. Thus, the proposed methodology for placing and sizing on-chip decoupling capacitors results in a greatly reduced budgeted on-chip decoupling capacitance as compared to a uniform (or blind) placement of on-chip decoupling capacitors into any available white space.

Figure 14:
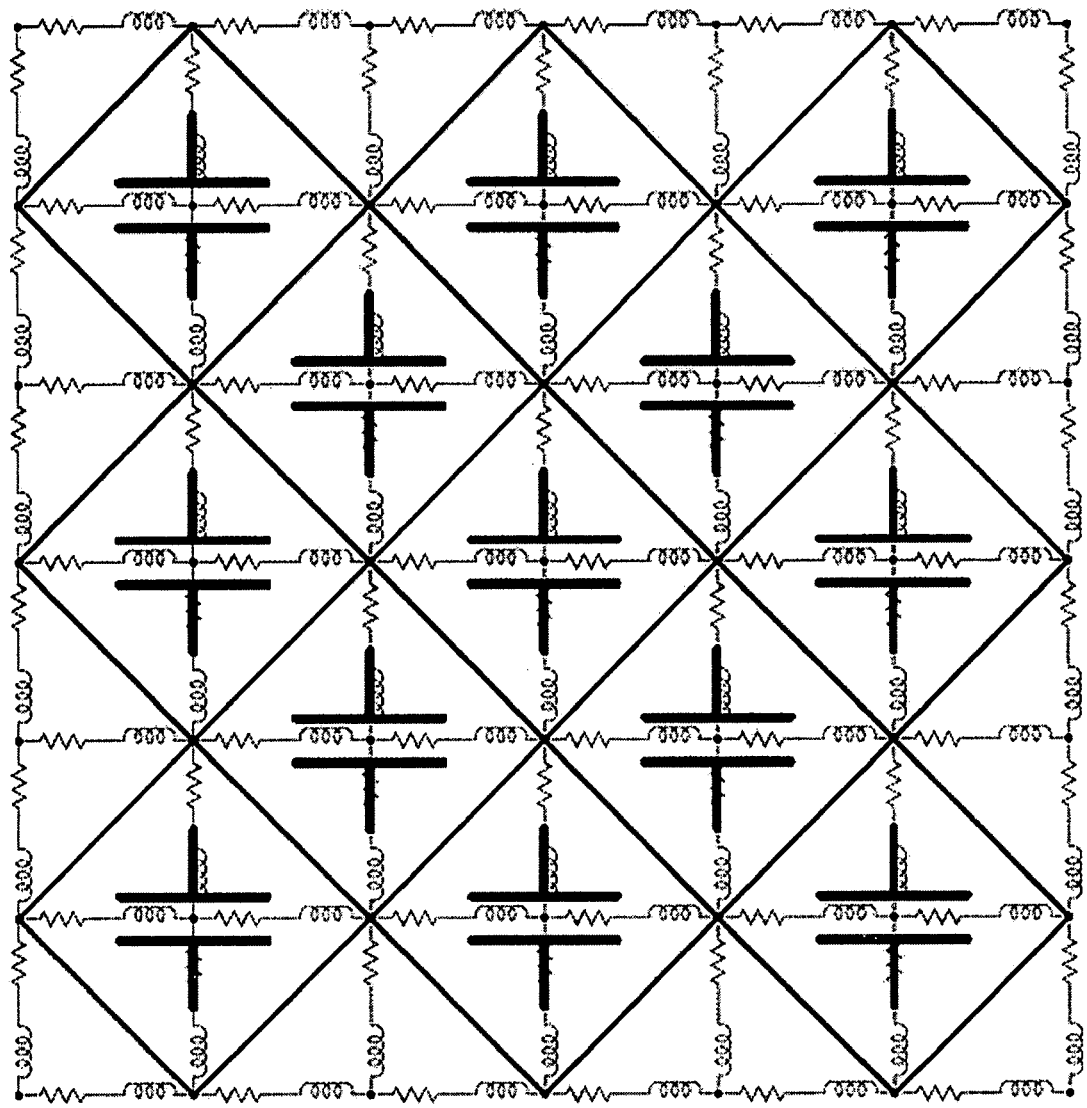
FIG. 14 shows a schematic example of allocation of on-chip decoupling capacitors across an IC.

Typically, multiple current loads exist in an IC. An on-chip decoupling capacitor is placed in the vicinity of the current load such that both the current load and the power supply are within their maximum effective radii. Assuming a uniform distribution of the current loads, a schematic example placement of the on-chip decoupling capacitors is shown in FIG. 14. Similar current loads are assumed to be uniformly distributed on the die. Each on-chip decoupling capacitor provides sufficient charge to the current load(s) within the maximum effective radius. Multiple on-chip decoupling capacitors are placed to provide charge to all of the circuit blocks. In general, the size and location of an on-chip decoupling capacitor are determined by the required charge (drawn by the local transient current loads) and certain system parameters (such as the per length resistance and inductance, power supply voltage, maximum tolerable ripple, and the switching characteristics of the current load).

While a preferred embodiment of the invention has been set forth in detail above, those skilled in the art who have reviewed the present disclosure will realize that other embodiments can be realized within the scope of the invention. For example, numerical values are illustrative rather than limiting, as are disclosures of specific fabrication technologies. Therefore, the invention should be construed as limited only by the appended claims.

We claim:

1. A method for determining placement of an on-chip decoupling capacitor in an integrated circuit and for fabricating the integrated circuit, the method comprising:
   (a) estimating a target impedance of a current load to which the on-chip decoupling capacitor is to be connected;
   (b) determining a maximum effective radius based the target impedance, the maximum effective radius based on the target impedance being a radius from the on-chip decoupling capacitor within which the current load must be located;
   (c) determining a maximum effective radius determined by a charge time for the capacitor from a power source, the maximum effective radius determined by the charge time being a radius from the on-chip decoupling capacitor within which the power source must be located;
   (d) determining a location of the on-chip decoupling capacitor relative to the current load and the power source such that the maximum effective radius based on the target impedance and the maximum effective radius determined by the charge time are satisfied;
   (e) making the location determined in step (d) available for fabrication of the integrated circuit; and
   (f) fabricating the integrated circuit in accordance with the location determined in step (d).

2. The method of claim 1, wherein step (c) comprises:
   (i) determining a required on-chip decoupling capacitance for the on-chip decoupling capacitor; and
   (ii) determining the maximum effective radius determined by the charge time from the required on-chip decoupling capacitor.

3. The method of claim 2, wherein step (c)(i) comprises:
   (A) determining a critical line length of a connection between the on-chip decoupling capacitor and the current load; and
   (B) determining the required on-chip decoupling capacitance based on the critical line length.

4. The method of claim 3, wherein step (c)(i)(A) comprises:
   (I) determining whether the maximum effective radius based on the target impedance is greater than the critical line length;
   (II) if the maximum effective radius based on the target impedance is greater than the critical line length, determining the required on-chip decoupling capacitance in accordance with a rise time of the current load; and
   (III) if the maximum effective radius based on the target impedance is not greater than the critical line length, determining the required on-chip decoupling capacitance in accordance with an entire switching event of the current load.

5. The method of claim 1, wherein step (d) comprises:
   (i) determining whether it is possible to satisfy both the maximum effective radius based on the target impedance and the maximum effective radius determined by the charge time;
   (ii) if it is possible to satisfy both the maximum effective radius based on the target impedance and the maximum effective radius determined by the charge time, determining the location of the on-chip decoupling capacitor without partitioning the current load; and
   (iii) if it is not possible to satisfy both the maximum effective radius based on the target impedance and the maximum effective radius determined by the charge time:
   (A) partitioning the current load into a plurality of partitions;
   (B) providing one of said on-chip decoupling capacitor for each of said plurality of partitions;
   (C) redetermining the maximum effective radius determined by the charge time for each of said plurality of partitions and its on-chip decoupling capacitor; and
   (D) determining relative locations in accordance with the maximum effective radius determined by the charge time and redetermined in step (d)(iii)(C).

6. The method of claim 1, wherein step (a) comprises estimating the target impedance in accordance with an impedance of a unit length wire and an equivalent frequency determined from a rise time of the current load.

7. The method of claim 6, wherein step (a) is performed by neglecting parasitic capacitance.

8. The method of claim 6, wherein the maximum effective radius based the target impedance is inversely proportional to a magnitude of the current load.

9. The method of claim 8, wherein the maximum effective radius based on the target impedance is also inversely proportional to a magnitude of the impedance of the unit length wire.

* * * * *